United States Patent
Martyn et al.

(10) Patent No.: US 7,314,124 B2
(45) Date of Patent: Jan. 1, 2008

(54) VIBRATION DAMPING APPARATUS

(75) Inventors: Gerald Henry Martyn, Somerset (GB);
Andrew Alan Lord, Somerset (GB);
Rebecca Diana Brodie, Suffolk (GB)

(73) Assignee: Westland Helicopters Limited, Yeovil (GB)

( * ) Notice: Subject to any disclaimer, the term of this patent is extended or adjusted under 35 U.S.C. 154(b) by 39 days.

(21) Appl. No.: 11/281,877

(22) Filed: Nov. 18, 2005

(65) Prior Publication Data
US 2006/0219504 A1    Oct. 5, 2006

(30) Foreign Application Priority Data
Nov. 18, 2004   (GB) ................................ 0425373.8

(51) Int. Cl.
*F16F 9/46* (2006.01)
(52) U.S. Cl. .................... 188/318; 188/312; 244/17.27
(58) Field of Classification Search ................ 188/312, 188/318, 315; 244/17.27; 52/167.1
See application file for complete search history.

(56) References Cited

U.S. PATENT DOCUMENTS

| | | | | |
|---|---|---|---|---|
| 3,638,885 | A | * | 2/1972 | Reed ........................ 244/17.27 |
| 4,070,035 | A | | 1/1978 | Pelouch |
| 4,084,668 | A | * | 4/1978 | Rybicki ...................... 188/312 |
| 4,936,423 | A | * | 6/1990 | Karnopp ................... 188/266.5 |
| 4,958,705 | A | * | 9/1990 | Horvath ........................ 188/314 |
| 5,347,771 | A | * | 9/1994 | Kobori et al. .............. 52/167.1 |
| 5,477,947 | A | | 12/1995 | Schalles et al. |
| 5,586,627 | A | * | 12/1996 | Nezu et al. ............... 188/266.6 |
| 5,738,191 | A | | 4/1998 | Forster |
| 6,085,501 | A | | 7/2000 | Walch et al. |
| 6,213,261 | B1 | | 4/2001 | Kunkel |
| 6,454,206 | B2 | * | 9/2002 | Vincent ................... 244/17.27 |
| 2002/0121416 | A1 | * | 9/2002 | Katayama et al. .......... 188/314 |

(Continued)

FOREIGN PATENT DOCUMENTS

EP        0 351 537        1/1990

(Continued)

OTHER PUBLICATIONS

Patent Abstracts of Japan, vol. 1996, No. 05, May 31, 1996 & JP 08 014308 A (Shimadzu Corp), Jan. 16, 1996 abstract.

(Continued)

*Primary Examiner*—Christopher P. Schwartz
(74) *Attorney, Agent, or Firm*—Stites & Harbison PLLC; Douglas E. Jackson

(57) ABSTRACT

A damping apparatus for damping vibrations in a vibrating system including a piston which is reciprocally movable in a hydraulic fluid filled damper chamber, piston movement in either direction of movement being resisted by fluid pressure in the damper chamber behind the piston, which resistance provides damping forces which act to oppose piston movement, the piston being connected to one component of the vibrating system and the damping chamber being connected to a second component of the vibrating system, characterised in that the fluid at at least a first side of the piston acts on a movable part which is movable in response to changing fluid pressure in the damper chamber at the first side of the piston as the piston moves, the movable member providing a relief volume for the fluid into which and from which fluid may flow from and towards the first side of the piston without passing to an opposite second side of the piston.

17 Claims, 2 Drawing Sheets

U.S. PATENT DOCUMENTS

2005/0095069 A1* 5/2005 Johansson et al. .......... 405/204

FOREIGN PATENT DOCUMENTS

| | | |
|---|---|---|
| EP | 0 621 417 | 10/1994 |
| EP | 1 054 185 | 11/2000 |
| EP | 1 130 280 | 9/2001 |
| GB | 1 055 516 | 1/1967 |
| GB | 2 283 799 | 5/1995 |
| WO | WO 03/066425 | 8/2003 |

OTHER PUBLICATIONS

Patent Abstracts of Japan, vol. 013, No. 477 (M-855), Oct. 27, 1989 & JP 01 188732 A (Nissan Motor CO LTD), Jul. 28, 1989 abstract.

* cited by examiner

VIBRATION DAMPING APPARATUS

BACKGROUND OF THE INVENTION

This invention relates to a vibration damping apparatus for damping vibrations in a vibrating system.

DESCRIPTION OF THE PRIOR ART

Hydraulic dampers, are known for use in helicopter rotor systems for example, for damping helicopter blade movements in a plane of rotation as the blades rotate (so called "lead-lag dampers"), although similar hydraulic dampers are provided in other vibrating systems to damp vibrations.

In one form of damping apparatus, the apparatus includes a piston movable in a chamber in response to vibrations, piston movement being resisted by hydraulic fluid pressure in the chamber at either side of the piston. Restricted fluid flow from one side of the piston to the other is permitted so that the piston may move in the chamber whilst providing damping forces to counteract such piston movements and provide damping.

To prevent overload at high piston velocities it is known to incorporate into the damping apparatus a load limiting device such as a pressure relief valve, which limits the maximum damping force which can be provided by relieving fluid pressure at either side of the piston when high fluid pressures are experienced.

Mechanical vibrating systems employing such hydraulic damping apparatus may experience modes of vibration other than at a fundamental frequency which primarily it is desired to damp. To damp such additional vibrations, may result in unacceptably high vibration being experienced in the surrounding structure.

The performance of such lead-lag dampers can be computer modelled. Such modelling enables, in the model, the variation of the different physical parameters of the damper, with a view to determining the physical parameters necessary to achieve optimum damping. It was discovered in the course of such modelling that significant improvement of the damping of the $4^{th}$ and $6^{th}$ harmonics of the fundamental frequency, which have been identified in a particular helicopter rotor system studied, could be achieved if the hydraulic fluid was a compressible fluid. However the degree of compressibility of hydraulic fluid required for effectiveness was illustrated by the model to be greater than that which can be provided by any suitable hydraulic fluids which currently are obtainable.

SUMMARY OF THE INVENTION

According to one aspect of the invention we provide a damping apparatus for damping vibrations in a vibrating system including a piston which is reciprocally movable in a hydraulic fluid filled damper chamber, piston movement in either direction of movement being resisted by fluid pressure in the damper chamber behind the piston, which resistance provides damping forces which act to oppose piston movement, the piston being connected to one component of the vibrating system and the damper chamber being connected to a second component of the vibrating system, characterised in that the fluid at at least a first side of the piston acts on a movable member which is movable in response to changing fluid pressure in the damper chamber at the first side of the piston as the piston moves, the movement of the movable member providing a variable relief volume for the fluid into which and from which fluid may flow from and towards the first side of the piston without passing to an opposite second side of the piston.

Such a construction simulates a damping apparatus in which the hydraulic fluid is compressible, the movable member moving in response to high hydraulic fluid pressures at the one side of the piston to increase the relief volume, which simulates the hydraulic fluid compressing, and moving in response to lower hydraulic fluid pressure at the one side of the piston to decrease the relief volume, which simulates the hydraulic fluid expanding.

Preferably, fluid at the second side of the piston acts on a further movable member which is movable in response to changing fluid pressure in the damper chamber at the second side of the piston as the piston moves, the movement of the further movable member providing a variable relief volume for the fluid into which and from which fluid may flow from and towards the second side of the piston without passing to the opposite first side of the piston.

In the damping apparatus of the invention, piston movement in the damper chamber may be achieved by a restricted flow of fluid being permitted, e.g. through one or more orifices in the piston, from each side of the piston to the other, as the piston is used by the vibrations.

Desirably, the damping apparatus includes a hydraulic fluid pressure relief means including a hydraulic fluid by-pass means which has relief valve which opens in response to fluid pressure at the first side of the piston exceeding a threshold pressure, to permit such highly pressurised fluid to pass from the one side of the piston to the second opposite side of the piston. The relief valve may open in response to fluid pressure at the second side of the piston exceeding the threshold pressure too, to permit such highly pressurised fluid to pass from the second side of the piston to the first side, or a separate fluid by-pass means may be provided to allow for the passage of fluid at a pressure above a threshold pressure, from the second side of the piston to the first side of the piston.

In one embodiment, the movable member is provided in a relief chamber which communicates with the damper chamber at the first or the respective first or second side of the piston, the volume of the relief chamber varying as the fluid pressure changes in response to piston movements in the damper chamber as the movable member moves. The relief chamber may communicate with the damper chamber via a conduit.

The movable member may be a relief piston which moves in the relief chamber in response to fluid pressure in the damper chamber at the first or the respective side of the piston, to vary the relief volume afforded by the relief chamber.

The relief piston may be resiliently mounted so as to be movable by high fluid pressure in the damper chamber against the resilient biasing, and to be moved against the fluid pressure by the resilient biasing. Such resilient biasing may be provided by a mechanical or fluid spring acting on an opposite side of the relief piston to the fluid pressure, or by a gas spring for example acting in an accumulator, or by other elastic media to provide the desired characteristic.

In each case, the effect of the varying relief volume afforded by movement of the movable member is entirely passive, the relief volume varying by an amount solely dependent upon the fluid pressure on the one hand, and the strength of the resilient biasing on the other hand.

In another embodiment, movable member movement in response to fluid pressure in the damper chamber at the or the respective side of the piston, is controlled by an active controller which provides control signals which depend upon inputs to the controller. For example sensory inputs to the controller may provide information concerning the state of the vibrating system to which the controller responds by providing a varying control signal to the movable member.

According to a second aspect of the invention we provide a vibrating system including a damping apparatus of the first aspect of the invention.

According to a third aspect of the invention we provide a helicopter including a rotor system having at least one damping apparatus of the first aspect of the invention between a rotor blade of the rotor system and a rotor hub which mounts the rotor blade.

BRIEF DESCRIPTION OF THE DRAWINGS

Embodiments of the invention will now be described with reference to the accompanying drawings in which.

DETAILED DESCRIPTION OF THE PREFERRED EMBODIMENTS

In a vibrating system such as a helicopter rotor system (main sustaining or tail rotor) a first component such as a rotor blade, is mounted in use to a second component namely a rotor hub. Between each blade and the hub, a vibration damping apparatus is provided to damp vibrations arising in the dynamic system during rotor rotation, and particularly vibrations arising in the plane of rotation of the blades, as the blades experience forces which cause the blades to tend to move relative to the rotating rotor hub.

Figure 1:
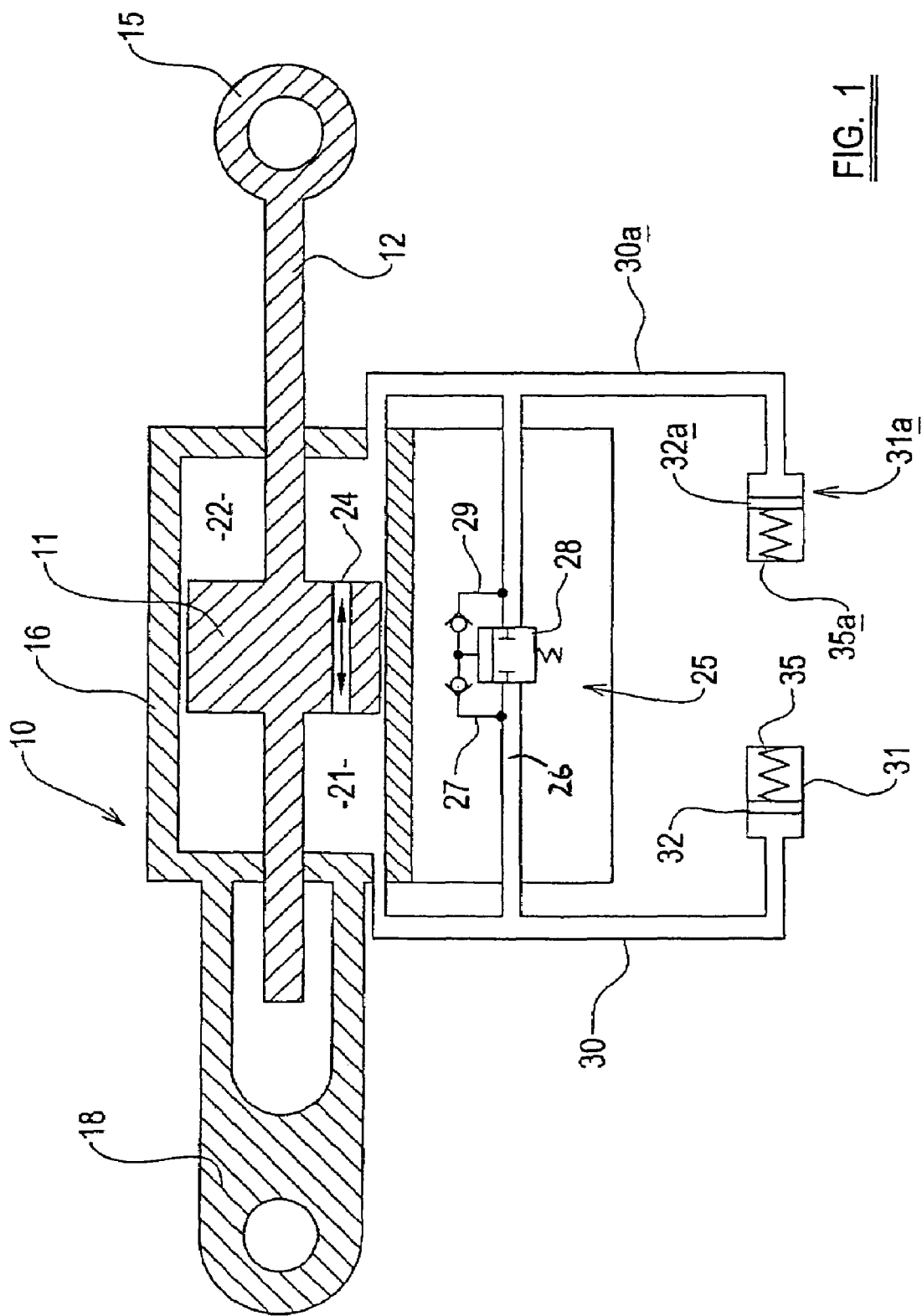
FIG. 1 is a diagrammatic illustration of a damping apparatus in accordance with the present invention.

Referring to FIG. 1, in a typical arrangement the damping apparatus 10 includes a piston 11 carried on a piston rod 12, the piston rod 12 having at or adjacent one end thereof, a first attachment formation 15 by means of which the damping apparatus 10 is attached to the first component namely the helicopter blade.

The piston 11 is provided in a damping chamber 16 which has a second attachment formation 18 by means of which the damping apparatus 10 is attached to second component which is the rotor hub.

The first and second components in use, will relatively vibrate due to disturbing forces to which they are subjected.

Piston 11 movement in the damping chamber 16 is however resisted by hydraulic fluid pressure in the damper chamber 16 behind the piston 11. When the piston 11 is urged in a first direction i.e. to the left as seen in the drawing, hydraulic fluid in the damping chamber 16 behind the piston 11 may pass from a first side 21 of the piston 11 to a second side 22 of the piston 11 through a flow path 24 through the piston 11. However the flow path 24, provided in this example by a single orifice, is restricted and as a result damping forces which oppose piston 11 movement will be provided. When the piston 11 is urged in an opposite second direction i.e. to the right in the drawing, hydraulic fluid may flow from the second side 22 of the piston 11 through the orifice 24, again in a restricted manner, to provide a damping force to oppose piston 11 movement in the opposite direction.

In another embodiment, restricted hydraulic fluid flow through the piston 11 may be provided by multiple flow paths 24 each of which may include or be an orifice, and in such an arrangement, if desired, each flow path through the piston 11 may have a one way valve (not shown) in this example, so that only fluid flow in response to one or other first or second directions of piston movement can occur.

In this example, the piston rod 12 extends from the first side 21 of the piston 11, through an opening in the axial end of the chamber 16 wall so that the piston 11 is positively guided throughout its entire range of movement.

The damping apparatus 10 further includes a hydraulic fluid by-pass means 25 which, when the hydraulic fluid pressure at either side 21, 22 of the piston 11 exceeds a threshold value, relieves fluid pressure behind the piston 11.

The by-pass means 25 includes in this example, a fluid passage 26 which extends from the first side 21 of the piston 11 to the second side 22 of the piston 11, and in the passage 26 there is provided a relief valve 28.

When the relief valve 28 is open, highly pressurised hydraulic fluid from either the first 21 or second 22 side of the piston 11 as the case may be, may flow through the passage 26 to the other side of the piston 11 to relieve the high pressure, and so that hydraulic fluid is not constrained to pass through the restricted orifice 24 flow path through the piston 11. Such fluid flow via the by-pass passage 26, is substantially unrestricted. Thus the damper assembly 10 is protected from over pressures.

Otherwise, in the absence of any excess pressure, the relief valve 28 will close and the damping assembly 10 will damp vibrations, particularly at the fundamental frequency being the frequency of rotation of the rotor system.

In this example, the relief valve 28 is responsive to hydraulic fluid pressure above the threshold pressure at either side of the piston 11, there being respective pilot lines 27, 29 containing one way valves, from either side 21, 22 of the piston 11 so that the hydraulic fluid pressure from either side 21, 22 of the piston 11, if above the threshold value determined by the relief valve 28, will open the relief valve 28.

In another arrangement, individual by-pass means may be provided each to enable fluid from one side 21, 22 only of the piston 11 to move to the other side 22, 21 respectively of the piston 11, in which case each such by-pass would require a one way valve to allow fluid flow in a single direction only.

The part of the by-pass fluid passage 26 which communicates with the first side 21 of the piston 11, includes a branch 30 which extends to a relief chamber 31. The relief chamber 31, shown in greater detail in FIG. 2, includes in this arrangement, a movable member 32 which is a relief piston carried on a relief piston rod 33. The relief piston 32 may move in the relief chamber 31 to vary the volume of the relief chamber 31 at a side of the relief piston 32 which is exposed to the hydraulic fluid pressure present in the branch 30. The hydraulic fluid pressure communicated to the relief piston 32 is thus dependent upon the hydraulic fluid pressure in the damper chamber 16 at the first side 21 of the piston 11.

Relief piston 32 movement in the relief chamber 31 in response to the fluid pressure at the first side 21 of the damper chamber 16, is resisted by a resilient biasing device which in this example is a coil spring 35. In another example, resilient biasing may be provided by a gas spring acting in an accumulator for example, or otherwise.

Thus the position of the relief piston 32 and hence the volume of the relief chamber 31 depends upon the fluid pressure at the first side 21 of the piston 11 in the damping chamber 16 on the one hand, and the strength of the spring 35 or other resilient biasing device on the other hand.

The relief chamber 31 thus provides a variable relief volume into which hydraulic fluid may pass from the branch 30 and hence from the damping chamber 16 at the first side 21 of the piston 11, and from which hydraulic fluid may pass towards the damping chamber 16 at the first side 21 of the piston 11, depending on the hydraulic fluid pressure and the strength of the spring 35.

Thus the movement of the movable member, i.e. the piston 32, simulates the hydraulic fluid being compressable or expandable, depending on fluid pressure.

A relief chamber 31a of substantially the same construction as relief chamber 31 is provided which communicates with the damping chamber 16 at the second side 22 of the piston 11 via a branch 30a from the passage 26 where the passage 26 communicates with the second side 22 of the piston 11 in the damping chamber 16. The relief chamber 31a and its movable member 32a together provide a relief volume which varies depending on the fluid pressure in the damping chamber 16 at the second side 22 of the piston 11 and the strength of its spring 35a or other resilient biasing device.

Referring again to FIG. 2, the coil spring 35 which bears on the movable member 32 in the relief chamber 31, acts between a shoulder 34 carried by the piston rod 33, and a stop 37, in a larger cross section portion 39 of the relief chamber 31, whereas the piston 32 carried at an end of the piston rod 33, acts in a smaller cross section portion 40 of the relief chamber 31. The piston rod 33 is guided adjacent the stop 37 by a hollow tube which receives the piston rod 33 end. Thus the movable member 32 is constrained to move linearly within the relief chamber 31. The relief chamber 31 is vented to atmosphere by the provision of holes in the relief chamber 31 side wall, in the larger cross section portion 39 thereof, so that piston 32 movement in the relief chamber 31 is not resisted by any air pressures in the relief chamber 31.

Figure 2:
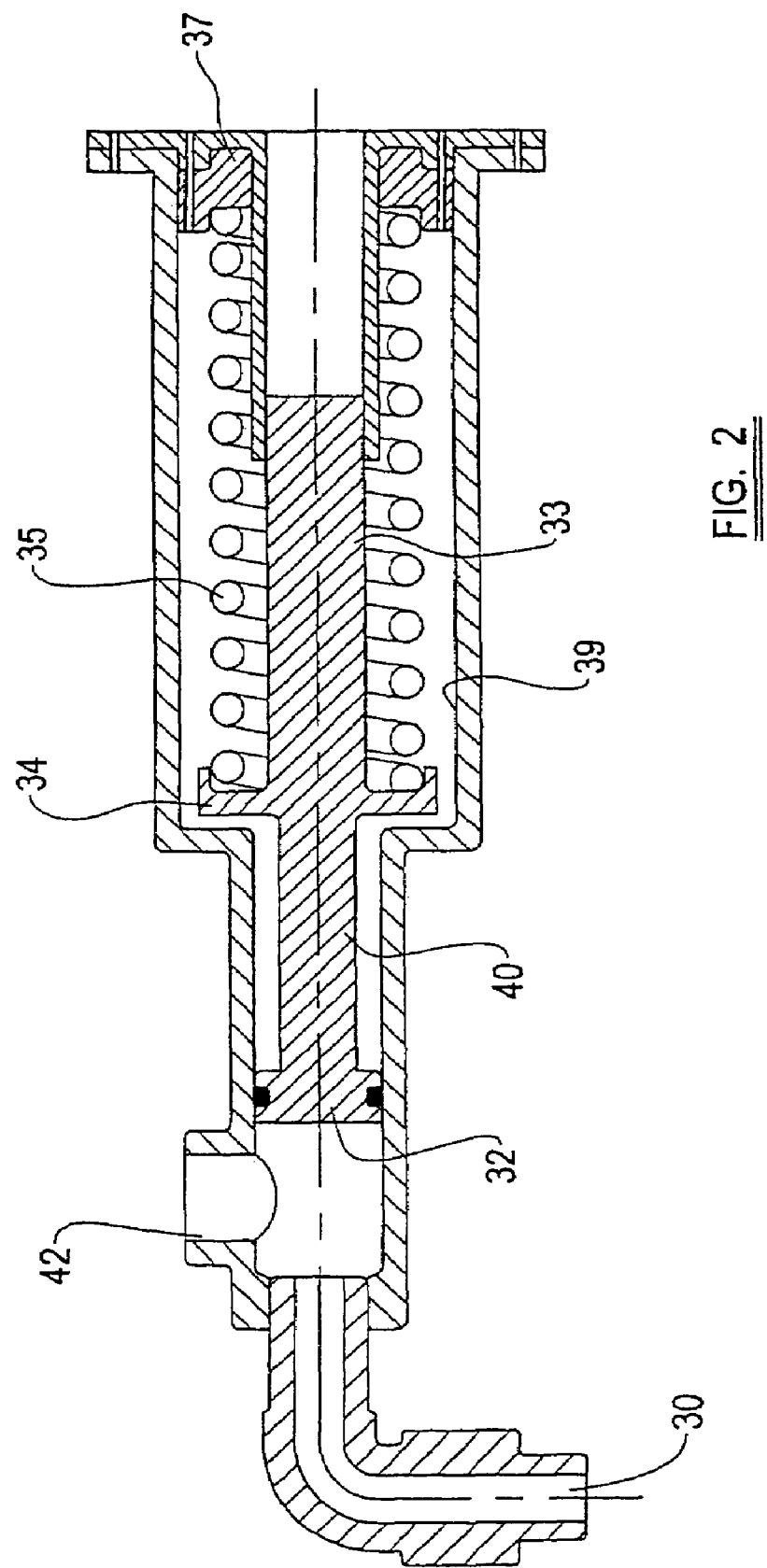
FIG. 2 is a more detailed but still illustrative side view of a relief chamber of the damping apparatus of FIG. 1.

It can be seen in FIG. 2, that the branch 30 from the by-pass passage 26 includes a bleed port 42 which is normally closed, but may be employed upon commissioning or maintenance of the damping apparatus 10.

Various other constructional modifications may be made to the damping apparatus 10 without departing from the scope of the invention. For example, it is envisaged that the relief volume need not be provided by a relief chamber 31, 31a and movable member 32, 32a which communicate with the respective side 21, 22 of the piston 11 in the damping chamber 16 via a respective branch 30, 30a from the by-pass passage 26.

In another embodiment, the two relief chambers 31 and 31a may be combined into a single module whereby a single spring 35 or 35a may be shared by both relief pistons 32, 32a, hence saving weight. Such an arrangement is possible because each side 21, 22 of the damper piston 11 is pressurised in turn, never at the same time, the pressure in the opposing chamber normally being zero In each case though, hydraulic fluid may flow from or towards the respective side 21, 22 of the piston 11 to or from the relief volume, in response to changing hydraulic fluid pressure, without passing to the opposite side 22, 21 of the piston 11 in the damping chamber 16.

Whereas the action of the piston 11 in the damping chamber 16, and the restricted flow of fluid through the flow passage(s) 24 of the piston 11 efficiently damp vibrations particularly arising at the fundamental frequency of the rotating rotor system, and the by-pass means 25 protects the damping apparatus 11 from excess pressures, the provision of a relief volume for the hydraulic fluid, which simulates the hydraulic fluid being more compressible than such fluid can presently be, reduces vibrations which may be harmonics of the fundamental frequency, and in the rotating system and damping apparatus 10 described, particularly the $4^{th}$ and $6^{th}$ harmonics.

The damping apparatus 10 so far described, have each been passive apparatus in that the volume of the or each relief chamber 31, 31a has depended solely upon the pressure of hydraulic fluid which acts on the movable member 32, 32a and the strength of the resilient biasing resisting movable member movement. It is envisaged that an active damping apparatus 10 may be provided.

In such an apparatus 10, movable member 32, 32a movement in response to fluid pressure in the damping chamber 16 at the or the respective side 21, 22 of the piston 11, would be controlled by an active controller which provides control signals which depend upon inputs to the controller. For example sensory inputs to the controller may provide information concerning the state of the vibrating system to which the controller responds by providing a varying control signal to the movable member.

The invention is of course more widely applicable than to the rotor system described, but may be applied to any vibrating system where there are vibrations at different frequencies, to damp vibrations at frequencies which the damping apparatus otherwise would not efficiently damp.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A damping apparatus, for damping vibrations in a helicopter rotor system, including
    a piston which is reciprocally movable in a hydraulic fluid-filled damper chamber, piston movement in either direction of movement being resisted by fluid pressure in the damper chamber behind the piston, which resistance provides damping forces which act to oppose piston movement,
    the piston being connected to one component of the vibrating system and the damper chamber being connected to a second component of the vibrating system,
    wherein the fluid at at least a first side of the piston acts on a movable member which is movable in a relief chamber in response to changing fluid pressure in the damper chamber at the first side of the piston as the piston moves, the movement of the movable member providing a variable relief volume in the relief chamber for the fluid into which and from which fluid may flow from and towards the first side of the piston without passing to an opposite second side of the piston.

2. A damping apparatus according to claim 1 wherein the volume of the relief chamber varies as the fluid pressure changes in response to piston movements in the damper chamber as the movable member moves.

3. A damping apparatus according to claim 2 wherein the relief chamber communicates with the damper chamber via a conduit.

4. A damping apparatus according to claim 3 wherein the movable member provides at least a part of a wall of the damper chamber at the or the respective side of the piston, which movable member moves to vary the relief volume available to the hydraulic fluid.

5. A damping apparatus according to claim 4 wherein the movable member is resiliently mounted so as to enable the movable member to be moved by high fluid pressure in the damper chamber, and to be moved against the fluid pressure by the resilient biasing.

6. A damping apparatus according to claim 3 wherein the movable member is a relief piston which moves in the relief chamber in response to fluid pressure in the damper chamber at the first or the respective side of the piston, to vary the relief volume afforded by the relief chamber.

7. A damping apparatus according to claim 2 wherein the movable member is a relief piston which moves in the relief chamber in response to fluid pressure in the damper chamber at the first or the respective side of the piston, to vary the relief volume afforded by the relief chamber.

8. A damping apparatus according to claim 7 wherein the relief piston is resiliently mounted so as to be movable by high fluid pressure in the damper chamber against a resilient biasing, and to be moved against the fluid pressure by the resilient biasing.

9. A damping apparatus according to claim 8 wherein the resilient biasing is provided by a mechanical or fluid spring acting on an opposite side of the relief piston to the fluid pressure.

10. A damping apparatus according to claim 1 wherein the damping apparatus includes a hydraulic fluid pressure relief means including a hydraulic fluid by-pass means which has a relief valve which opens in response to fluid pressure at the first side of the piston exceeding a threshold pressure, to permit such highly pressurized fluid to pass from the one side of the piston to the second opposite side of the piston.

11. A damping apparatus according to claim 10 wherein the relief valve also opens in response to fluid pressure at the second side of the piston exceeding the threshold pressure, to permit such highly pressurized fluid to pass from the second side of the piston to the first side.

12. A damping apparatus according to claim 10 wherein a separate fluid by-pass means is provided to allow for the passage of fluid at a pressure above a threshold pressure, from the second side of the piston to the first side of the piston.

13. A damping apparatus according to claim 1 wherein piston movement in the damper chamber is achieved by a restricted flow of fluid being permitted from one side of the piston to the other.

14. A damping apparatus according to claim 13 wherein the restricted flow of fluid from one side of the piston to the other is through one or more orifices in the piston.

15. A damping apparatus according to claim 1 wherein movable member movement in response to fluid pressure in the damper chamber at the or the respective side of the piston, is controlled by an active controller which provides control signals which depend upon inputs to the controller.

16. A damping apparatus according to claim 15 wherein sensory inputs to the controller provide information concerning the state of the vibrating system to which the controller responds by providing a varying control signal to the movable member.

17. A damping apparatus according to claim 1 wherein fluid at the second side of the piston acts on a further movable member which is movable in a further relief chamber in response to changing fluid pressure in the damper chamber at the second side of the piston as the piston moves, the movement of the further movable member providing a variable relief volume in the further relief chamber for the fluid into which and from which fluid may flow from and towards the second side of the piston without passing to the opposite first side of the piston.

* * * * *